(12) United States Patent
Carson (10) Patent No.: US 8,154,817 B2
(45) Date of Patent: Apr. 10, 2012

(54) COMPENSATION FOR DIFFERENT TRANSDUCER TRANSLATION PATH GEOMETRIES

(75) Inventor: Douglas M. Carson, Cushing, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 165 days.

(21) Appl. No.: 12/555,630

(22) Filed: Sep. 8, 2009

(65) Prior Publication Data

US 2010/0061004 A1    Mar. 11, 2010

Related U.S. Application Data

(60) Provisional application No. 61/094,828, filed on Sep. 5, 2008.

(51) Int. Cl.
    *G11B 21/02* (2006.01)
(52) U.S. Cl. ........... 360/75; 369/13.56; 369/47.36
(58) Field of Classification Search ........... None
    See application file for complete search history.

(56) References Cited

U.S. PATENT DOCUMENTS

| | | | |
|---|---|---|---|
| 5,682,274 A | 10/1997 | Brown et al. | |
| 5,854,722 A | 12/1998 | Cunningham et al. | |
| 6,243,350 B1 | 6/2001 | Knight et al. | |
| 6,577,463 B1 | 6/2003 | Frees et al. | |
| 6,631,110 B1 | 10/2003 | Seo et al. | |
| 7,359,305 B2 | 4/2008 | Tsukuda et al. | |
| RE40,955 E * | 11/2009 | Le et al. | 360/77.08 |
| 2002/0126604 A1 | 9/2002 | Powelson et al. | |
| 2005/0111314 A1 | 5/2005 | Kojima | |
| 2007/0097819 A1* | 5/2007 | Hanks et al. | 369/47.49 |

* cited by examiner

*Primary Examiner* — Andrew L Sniezek
(74) *Attorney, Agent, or Firm* — Hall, Estill Attorneys at Law (57) ABSTRACT

Method and apparatus for compensating for differences in translation path geometries of transducers used to access a data storage medium. A compensation profile is generated in relation to radial error between a first translation path geometry of a first transducer and a different, second translation path geometry of a second transducer. A control circuit directs the first transducer to write data to a rotatable data storage medium in relation to the compensation profile to emulate the second translation path geometry. In some embodiments, the control circuit comprises a data signal clock generator, a motor rotation clock generator, and a transducer radial translation clock generator. A nearest pulse detector identifies a closest clock signal pulse to a once-per-revolution (OPR) rotational reference, and the control circuit adjusts a frequency of the associated clock signal coincident with the closest pulse.

24 Claims, 11 Drawing Sheets

COMPENSATION FOR DIFFERENT TRANSDUCER TRANSLATION PATH GEOMETRIES

RELATED APPLICATIONS

This application makes a claim of domestic priority under 35 U.S.C. §119(e) to U.S. Provisional Patent Application No. 61/094,828 filed Sep. 5, 2008.

BACKGROUND

Some types of data storage media are in the form of discs, which are rotated at a specified rate adjacent a data transducer. Data are often written to an optical disc as a pattern sequence of pits and lands (marks) that provide different optically reflective responses to an optical pickup mechanism. Data can be written to magnetic discs as a series of magnetic transitions by a read/write transducer, which are subsequently recovered by sensing the magnetic flux transition patterns. Other types of media can utilize various other types of storage and readback configurations.

Various transducers can be used to access these and other types of media, and such transducers may be coupled to movement mechanisms, such as actuators, that move the transducers radially adjacent the media while the media are controllably rotated. Such actuators can have various geometries, such as linear or rotary. Generally, a linear actuator advances a transducer is a substantially linear path across the medium, whereas a rotary actuator may rotate about a pivot point adjacent an outermost diameter of the medium (such as via a voice coil motor, VCM) to advance a transducer along an arcuate path across the radius of the medium.

Data stored to a particular medium may be written by the same, or by a different, mechanism used to read back the data. When different styles and/or geometries are utilized to write data to readback data, the data written to the medium by a first mechanism may not be placed in an optimal relation to the physical medium for subsequent readback by a different, second mechanism.

SUMMARY

Various embodiments of the present invention are generally directed to a method and apparatus for compensating for differences in transducer translation path geometries.

In accordance with some embodiments, a method generally comprises generating a compensation profile in relation to radial error between a first translation path geometry of a first transducer and a different, second translation path geometry of a second transducer; and using the first transducer to write data to a rotatable data storage medium in relation to the compensation profile to emulate the second translation path geometry.

In accordance with other embodiments, an apparatus generally comprises a first transducer configured to radially advance across a rotatable storage medium along a first translation path geometry. A control circuit is configured to direct the first transducer to write data to the medium in relation to a generated compensation profile, the compensation profile identifying radial error between the first translation path geometry and a different, second translation path geometry along which a second transducer is configured to radially advance adjacent the medium. The data are written by the first transducer in accordance with the compensation profile to emulate the second translation path geometry.

In this way, the data pre-written to the storage medium by the first transducer will nominally appear as if the data had been written by the second transducer since use of the compensation profile will substantially eliminate the radial error between the respective translation path geometries. The pre-written data will thus be optimally placed for subsequent access by the second transducer in an end-use system environment.

These and other features and advantages of the various embodiments of the present invention will become apparent upon a review of the following detailed description and appended drawings.

DETAILED DISCUSSION

Generally, the various embodiments set forth herein are directed to a method and apparatus for compensating for translation path geometry errors as data are written to a storage medium. The various embodiments can be applied to various types of recording systems include magnetic, optical, magneto-optical, etc., and to various types of actuator paths (linear, rotary, etc).

The various embodiments can be used with constant angular velocity (CAV) recording, constant linear velocity (CLV) recording, or media with zones employing both. Media that utilize different concentric radial zones of tracks with constant recording frequency in each zone (so-called zone based recording) can readily be utilized. The media can utilize concentric discrete tracks or tracks formed from a continuous spiral. The data written to the media can be any type of data including without limitation servo data, final user data, header data to subsequently locate the subsequent writing of data, etc.

Figure 1:
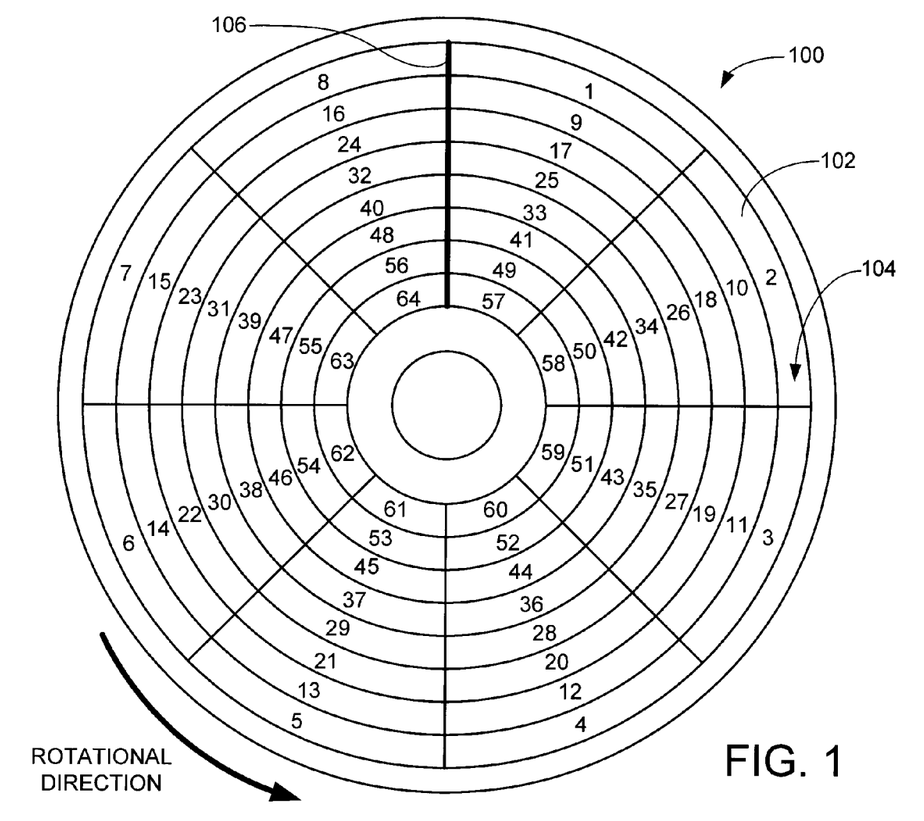
FIG. 1 shows an exemplary data storage medium characterized as an optical disc to which a number of sectors have been written along discrete concentric tracks.

To illustrate these and other features of the present disclosure, reference is first made to FIG. 1 which shows a data storage medium 100. The storage medium 100 is preferably characterized as an optical disc, although such is not limiting.

The medium includes a total of 64 recording sectors 102 denoted as sectors 1 through 64. The sectors 102 are recorded on eight concentric tracks 104. Sectors 1-8 are located on the outermost track and sectors 57-64 are located on the innermost track. All of the sectors are ideally spaced equally in the radial dimension and occupy the same angular distance around the medium 100.

The start of sectors 1, 9, 17, 25, 33, 41, 49 and 57 are all located on the same angular straight line 106, which is characterized an angular rotational reference (once-per-rev index point). It will be appreciated that typical storage media will have many more sectors per track, and many more tracks per layer, so the simplified representation in FIG. 1 is merely for purposes of discussion.

Figure 2:
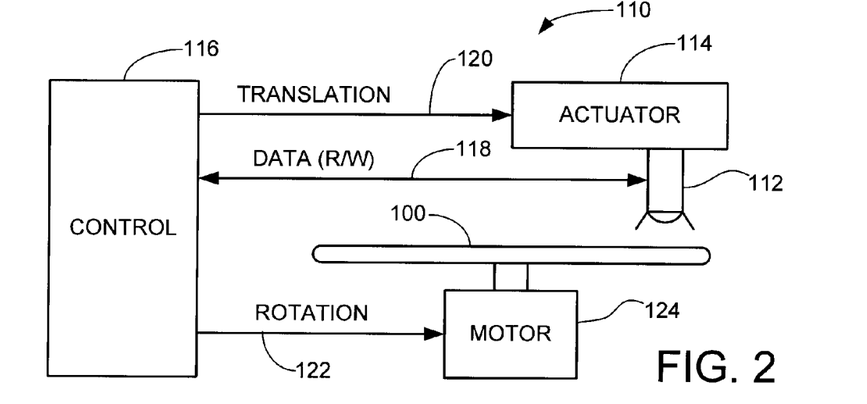
FIG. 2 is a write system configured to write the data to the disc in FIG. 1.

FIG. 2 provides a functional block representation of a recording system 110 configured to record the sectors 102 to the disc 100 in FIG. 1. The recording system can take any of a variety of forms depending upon the application, including an optical disc drive (ODD), a servo track writer (STW), an electron beam recorder (EBR), a laser beam recorder (LBR), etc.

The system 110 includes a transducer 112 which is controllably advanced by an actuator 114 to write data to and read data from the disc. The transducer 112 can be characterized as an optical pickup (OPU) with data read/write, focus and servo tracking capabilities.

A control circuit 116 provides various signals during a data write operation to the disc 102. These signals include a read/write (data) signal on path 118 to control modulation of the OPU 112, a servo translation signal on path 120 to control advancement of the write beam generated by the OPU 112, and a motor rotation signal on path 122 to control the rotation of the disc by a motor 124. The control circuit 116 outputs these various signals to record the sectors on the disc substrate in the desired locations. The control circuit may also receive read signals from the transducer during the reading of previously written data.

In order to write the data sector pattern of FIG. 1, the control circuit 116 can operate to sequentially write each track of sectors in turn from the outermost diameter (OD) to the innermost diameter (ID). The control circuit 116 will initially position the write transducer 112 at a radial position corresponding to the outermost track, and wait for the angular rotation reference 106 to be detected. The control circuit 116 will then commence to write each of the sectors 1-8 to the first track.

The control circuit 116 will next command a radial translation of the transducer inwardly by an appropriate linear distance so that the transducer is at a radial position corresponding to the second most outer track. Once the angular reference 106 is detected, the control circuit 116 will proceed to write sectors 9-16 to the second track.

This process will continue until all 64 sectors are written. When reading back the disc 100 using the system 110 of FIG. 2, the control circuit 116 can position the transducer 112 as required to recover the contents of any desired sector using the same incremental deflection signals that were used to radially advance the transducer during the writing of the sectors. While the foregoing example writes an entire track width on each write rotation, it will be appreciated that the sectors can be written using multiple incremental passes per track, with the results of each pass stitched together to provide the finally written sectors. Moreover, the sectors can be arranged in a continuous spiral as opposed to discrete concentric tracks as shown.

Figure 3A:
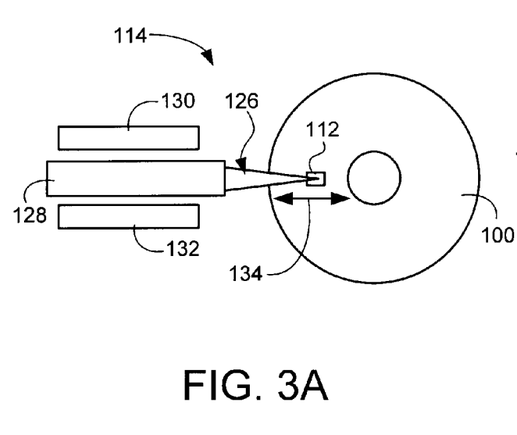
FIGS. 3A-3B alternatively characterize the actuator of FIG. 2 as a linear actuator and as a rotary (pivot) actuator.

FIG. 3A shows the actuator 114 of FIG. 2 in accordance with some embodiments. In FIG. 3A, the actuator is characterized as a linear actuator. A main body portion 126 supports a coil 128 of a linear voice coil motor (VCM) between a magnetic circuit formed by opposing magnetic members 130, 132. The members may each include a magnet and/or a magnetically permeable pole piece to form a substantially uniform magnetic flux therebetween. A distal end of the body portion 126 supports the transducer 112. The transducer is linearly advanced across the radius of the medium 102 along a linear path 134 by applying control currents of suitable magnitude and polarity to the coil 128. This linear path 134 is characterized as a linear translation path geometry and is determined by mechanical and electrical characteristics of the actuator.

Figure 3B:
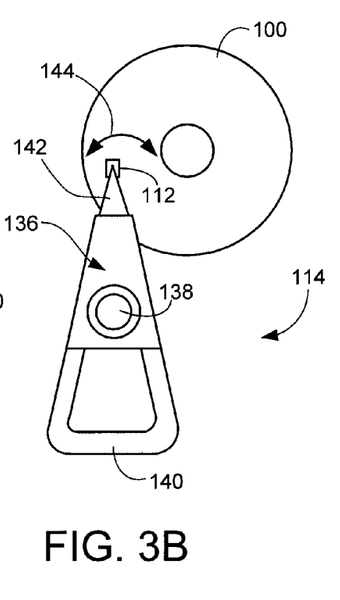

FIG. 3B shows the actuator 114 of FIG. 2 in accordance with other embodiments. In FIG. 3B, the actuator is characterized as a rotary (pivot) actuator. A main body portion 136 pivots about a pivot point 138, such as via a shaft and bearing assembly. A flat VCM coil 140 is immersed in the magnetic field of a magnetic circuit (not shown) arranged to lie above and below the coil 140.

The transducer 112 is supported at a distal end of an actuator swing arm 142. The application of controlled currents of suitable magnitude and polarity to the coil 140 induces rotational movement of the body portion 136 about the pivot 138. As the body pivots, the swing arm 142 moves the transducer 112 across the radius of the disc 102 along a rotational (pivot) path 144. The pivot path 144 is characterized as a pivot translation path geometry defined by the mechanical and electrical characteristics of the actuator.

Figure 4A:
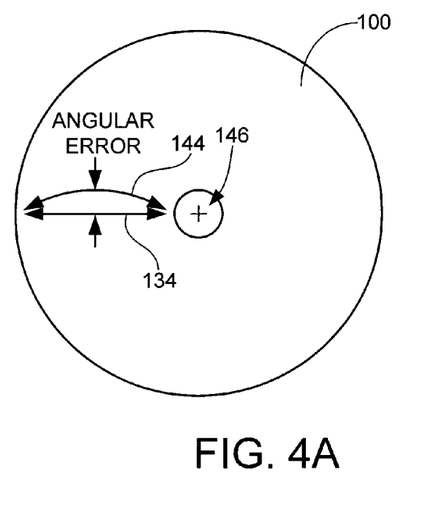
FIGS. 4A-4B show different errors in translation path geometries for transducers advanced by different configurations of actuators.

FIG. 4A illustrates the relative angular error between the respective linear and pivot translation path geometries 134, 144 of FIGS. 3A-3B. The reference to "angular" error means an angular offset distance with respect to the disc between the respective path geometries. The arc geometry of the pivot path 144 will be determined by a number of factors including an effective length L of the arm 142 between the transducer 112 and the pivot 138 and the relative placement of the pivot 138 relative to a central axis 146 about which the disc 102 rotates. It is contemplated that the linear path 134 will be aligned to intersect the disc central axis 146, although such is not necessarily required.

In the case of some read/write systems such as magnetic hard disc drives (HDDs), data patterns are often read back by the same actuator assembly which was used to record the data patterns. Relative angular error in write geometry such as illustrated in FIG. 4A will therefore not be present in such systems.

In other systems, the recording or pre-formatting apparatus used to write data patterns to a medium may be different than that used to subsequent read the data patterns. For example, certain data patterns may be written to a medium using a first actuator with a first type of geometry, such as the linear path 134, and then subsequently read from the medium using a second actuator with a second type of geometry, such as the rotary path 144.

Figure 4B:
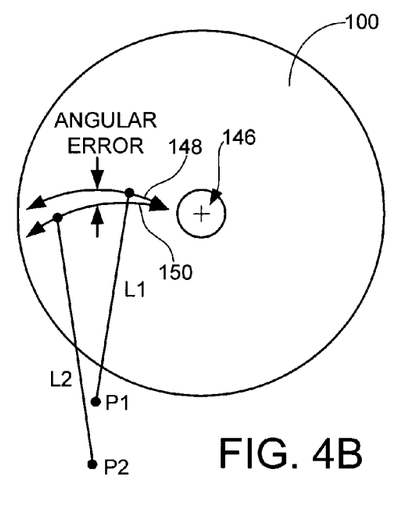

Alternatively, data patterns may be written using a first rotary actuator with a first swing arm length and pivot placement, and then subsequently read using a second rotary actuator with a second swing arm length and pivot placement. An example of the relative angular error in this latter case is shown in FIG. 4B for pivot translation path geometries 148, 150 with respective swing arm lengths L1, L2 and pivot points P1, P2.

In these and other cases, the relative angular error between the pattern initially written to a substrate and the transducer translation geometry during a subsequent read may introduce difficulties in properly positioning the read transducer. This angular error can be generally compensated in a variety of ways, such as by computing the error between the writing translation method and the reading translation method for each rotation, and adding or subtracting small values of time to the writing signal for each rotation changing the time at which each track of data is written.

Another type of error between track geometries is referred to herein as radial, or track pitch (TP) error. This type of error generally relates to different track widths being written to a medium based on differences in translation path geometry. As discussed below, various embodiments presented herein are generally directed to compensating for such radial error between different translation path geometries. The various embodiments can also be used to correct for angular errors as well.

Figure 5A:
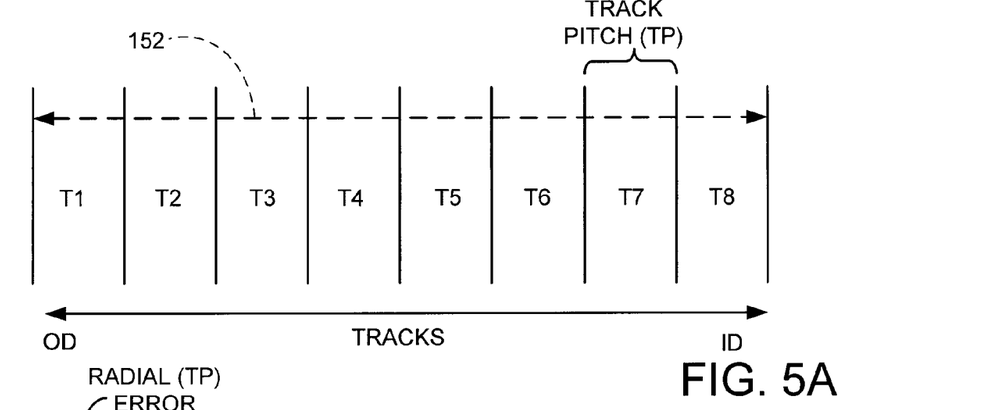
FIGS. 5A-5C illustrate variations in track pitch caused by the use of different translation path geometries, as well as a manner in which a second translation path geometry can be emulated using a first translation path geometry.

FIG. 5A represents a portion of a recordable substrate with radially arranged tracks 1-8 from the OD to the ID of the substrate. A linear translation path is denoted by broken line 152. Track pitch (TP) represents radial distance from one track to the next, that is, the effective width of each track. It is contemplated that there will be a selected number of translation steps from one track boundary to the next, such as eight (8) steps per track.

Due to the fact that linear actuators generally advance or retract a transducer the same linear distance per step (electrical pulse or increment), the same number of translation steps will create the same pattern track pitch for each track. The constant TP tracks in FIG. 5A can thus be written by translating a linear actuator the same number of steps (such as 8 steps) at the commencement of each new track.

Figure 5B:
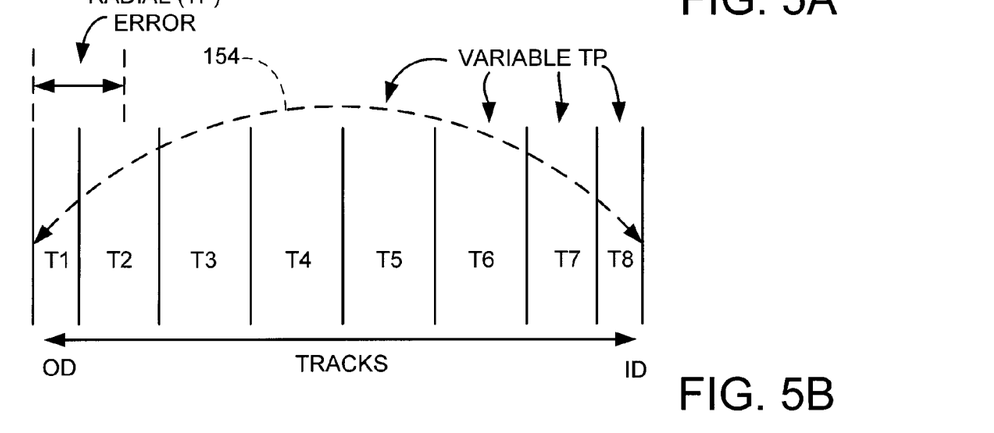

FIG. 5B shows another recordable substrate with radially arranged tracks 1-8 from OD to ID. A pivot translation path is denoted by arcuate broken line 154. The amount of curvature in the path 154 is exaggerated for simplicity of illustration. As before, each of the tracks 1-8 in FIG. 5B was written by advancing the transducer a fixed number of steps per track.

The substrate in FIG. 5B has a variable track pitch TP, with tracks nearest the ID and OD being narrower than intermediate tracks. This is due including to the fact that pivot actuators generally move the same angular distance per step, but this deflection will have both radial and angular components that vary with disc radius. Track 1 in FIG. 5B is thus significantly narrower than Track 1 in FIG. 5A, and this difference in radial distance constitutes radial (TP) error. It will be noted that each of the tracks in FIG. 5B have different amounts of such radial error depending on radius, with intermediate tracks having little (or substantially no) radial error.

Figure 5C:
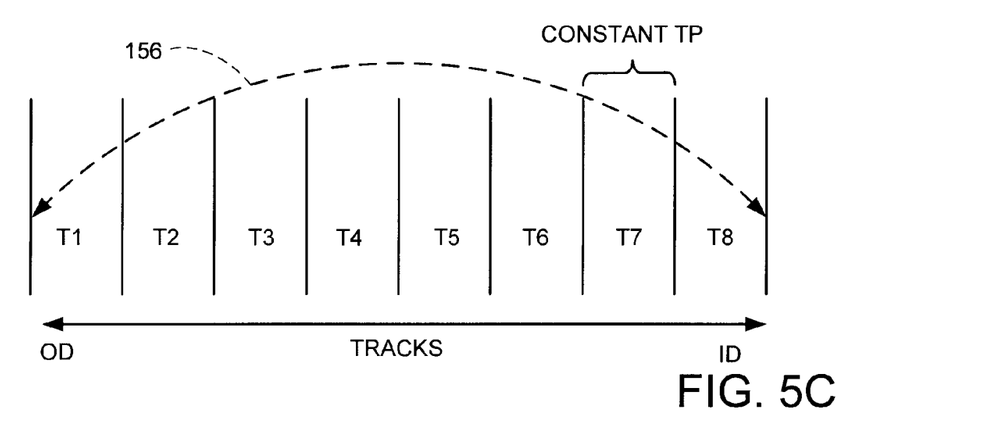

FIG. 5C shows another substrate with tracks 1-8 that are written using the same pivot actuator as in FIG. 5B. The actuator translates the write transducer along path 156. In FIG. 5C, different numbers of steps are used to provide a substantially uniform track pitch. The track pitch of FIG. 5C thus generally corresponds to the track pitch of FIG. 5A. It will be appreciated that, alternatively, different numbers of steps could be applied to the linear actuator of FIG. 5A to generate the variable track pitch of FIG. 5B.

Figure 6A:
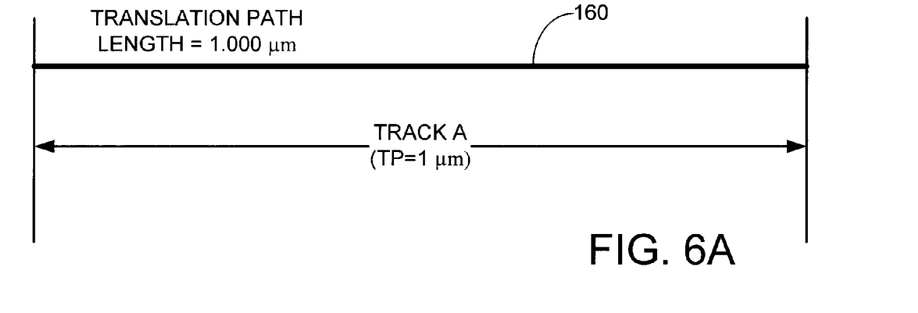
FIGS. 6A-6C provide different effective translation path lengths across respective tracks.

The number of steps required for each track is determined based on a number of factors including the geometry of the translation arc and the desired pattern track pitch. The manner in which translation geometry compensation is carried out in accordance with various embodiments will now be discussed beginning with FIG. 6A, which shows an exemplary Track A written using a linear translation path 160. For purposes of discussion, Track A is contemplated as having a track pitch of 1 micron, μm ($1 \times 10^{-6}$ m), so that the length of the linear translation path 160 across Track A is exactly 1.000 μm.

Figure 6B:
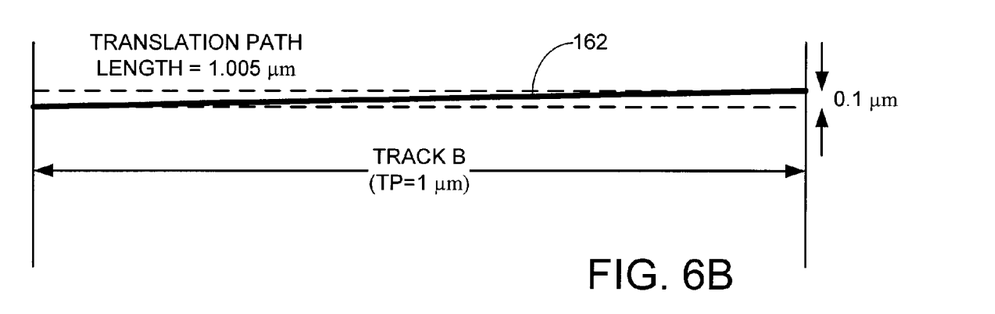

FIG. 6B shows a second Track B, which also has a track pitch of 1 μm. The write transducer is pivot translated across the track along pivot translation path 162. The pivot translation path 162 has a Y distance (radial width) of 1.000 μm, an X distance (angular deflection) of 0.100 μm, and an overall path length PL of 1.005 μm (where $PL^2 = X^2 + Y^2$).

In this case, the pivot translation system would require instructions or pulses to move 1.005 μm in order to achieve a pattern TP of 1.000 μm. In this example the R/W transducer would be located at a radius which is very close to the tangent of a linear transducer.

Figure 6C:
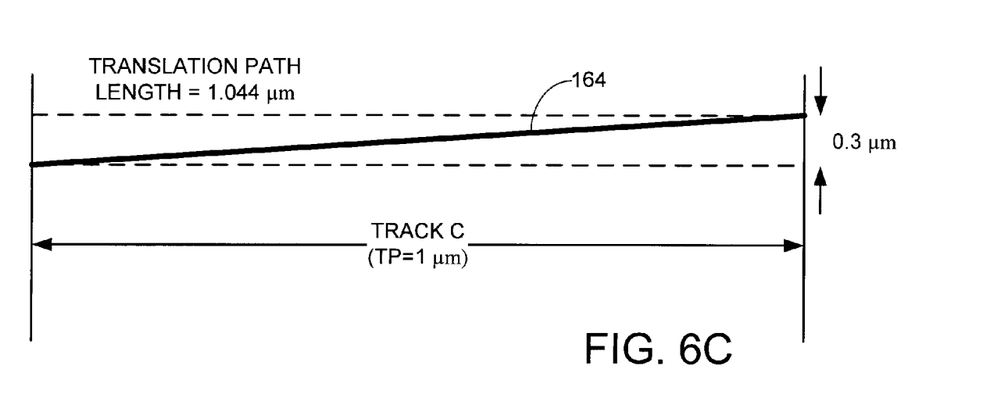

FIG. 6C provides a third Track C with TP=1 μm written using a pivot translation path 164. X and Y deflection values are 1.000 μm and 0.300 μm, and overall path length PL is 1.044 μm (where $PL^2 = X^2 + Y^2$). In this case, the pivot translation system would require instructions or pulses to move an overall distance of 1.044 μm in order to achieve a pattern TP of 1.000 μm. In this example the R/W transducer would be located at a radius which is farther away to the tangent of a linear transducer than in FIG. 6B.

A write system such as 110 in FIG. 2 will generally operate to maintain a fixed relationship between the rotation signal and translation signal regardless if the substrate is rotated in constant linear velocity (CLV) or constant angular velocity (CAV) mode. Rotation motors such as 124 will move a precise angular distance for each rotation pulse, for example 0.1 degrees per pulse. A fixed number or rotation pulses will cause the rotation motor to rotate exactly one revolution, for example 3600 pulses per rotation. Linear translation transducers will move a precise linear distance for each translation pulse, for example 0.1 micron per pulse. A fixed number of translation pulses will cause the translation transducer to move a precise linear distance, for example 10,000 pulses per 1 mm.

In the case where the pattern track pitch is a multiple of the linear translation transducer step size, then a whole number of translation steps will be utilized for each rotation. For example with a step size of 0.1 μm and a pattern track pitch of 1.5 μm, precisely 15 translation steps equally spaced around one rotation will create a smooth spiral groove of exactly 1.5 μm. However, if the pattern track pitch is 1.55 μm, then 15.5 translation steps will be required for each rotation.

Figure 7:
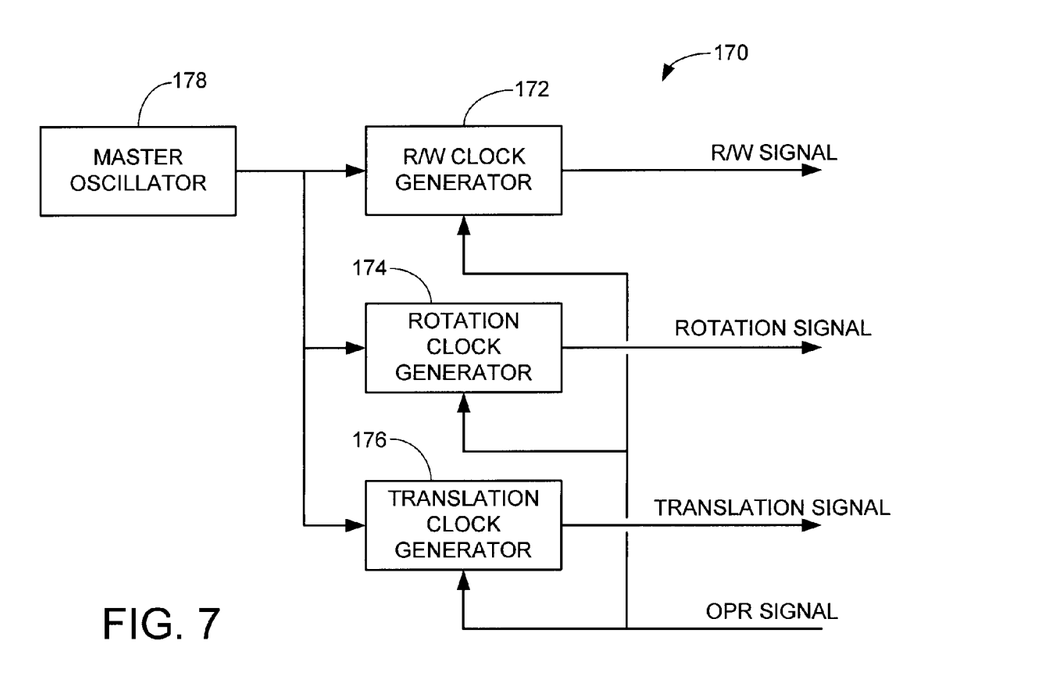
FIG. 7 is a functional block representation of a control circuit which operates in accordance with some embodiments to emulate a second translation path geometry using a transducer advanced in accordance with a first translation path geometry.

FIG. 7 shows a control circuit 170 that can be used in the system 110 of FIG. 2. The control circuit 170 can be realized in hardware, firmware or software and includes a data (R/W) clock generator 172, a rotation clock generator 174 and a translation clock generator 176. Each of these modules operates responsive to a master clock signal from a master oscillator 178 and a once per revolution (OPR) signal.

When recording is carried out in CAV mode, all three clock generators can be configured or programmed to output a particular constant frequency. For example, assume a recording substrate is provided with 1,000,000 data elements per rotation, and a pattern track pitch of 1.23 µm using a linear translation transducer requiring one pulse per 0.1 µm. Further assume that the substrate is rotated at 10 RPM using a rotation motor requiring 3600 pulses per rotation. Under these circumstances, the following clock generator signal frequencies may be used:

TABLE 1

| Rot. Clock | 2,160,000 Hz | (10 rpm × 60 sec/min × 3600 pulses/rev) |
|---|---|---|
| Trans. Clock | 7,380 Hz | (10 rpm × 60 sec/min × 1.23 µm TP/0.1 µm/step) |
| R/W Clock | 600,000,000 Hz | (10 rpm × 60 sec/min × 1,000,000 data/rot) |

For CAV recording, there is no need to change any of the clock frequencies on a per rotation basis. Rather, the above values can be maintained for all data written to the disc. On the other hand, CLV recording may require changes to the rotation and translation clock frequencies at least once per rotation, while maintaining the R/W clock at a constant frequency in order to achieve the desired CLV.

With reference again to the control circuit 170 of FIG. 7, assume CLV recording will be used at 600,000,000 Hz (600 MHz) R/W data with a beginning rotation rate of 10 RPM at a disc radius of 24 mm. Further assume the CLV recording will continue outwardly to an outer diameter of 58 mm using a rotation motor requiring 3600 pulses per rotation. As before, the pattern will be written with a pattern track pitch of 1.23 µm using a linear translation transducer requiring one pulse per 0.1 µm. In such case, the following clock frequencies may be generated:

TABLE 2

| R/W Clock | 600 MHz | |
|---|---|---|
| Rot. Clock(24 mm) | 2,160,000 Hz | (10 rpm × 60 sec/min × 3600 p/rev) |
| Rot. Clock(58 mm) | 893,808 Hz | (4.138 rpm × 60 sec/min × 3600 p/rev) |
| Trans. Clock(24 mm) | 7,380 Hz | (10 rpm × 60 sec/min × 1.23 µm TP/0.1 µm/step) |
| Trans. Clock(58 mm) | 3053.844 Hz | (4.138 rpm × 60 sec/min × 1.23 µm TP/0.1 µm/step) |

It will be appreciated that the rotation and translation clocks will be continuously adjusted from the ID to the OD in accordance with a suitable profile, such as linearly. Other profiles can be used as desired.

Figure 8:
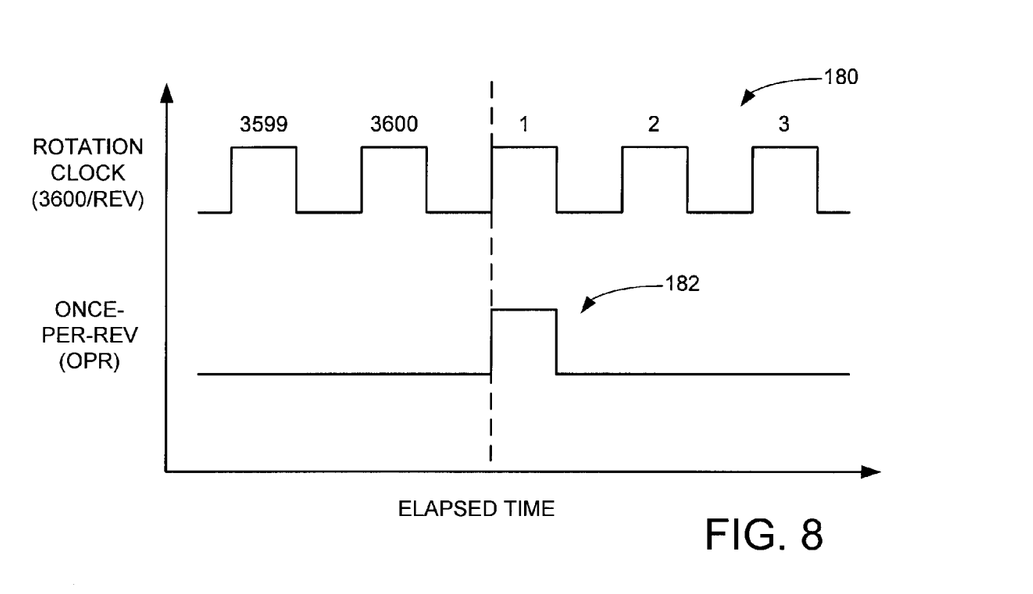
FIG. 8 graphically illustrates rotation clock and once-per-revolution (OPR) pulses from FIG. 7.

FIG. 8 shows a motor rotation signal 180 in accordance with the foregoing discussion. The rotation signal 180 is generated by the rotation clock generator 174 of FIG. 7 and constitutes exactly 3600 pulses per revolution. Pulse 1 in the clock signal 180 corresponds to the once-per-rev rotational reference. A once-per-rev (OPR) pulse 182 can be generated responsive to this reference, such as by detecting the motor rotation pulse 1 in the clock signal 180 and outputting a pulse coincident with the rotation pulse 1. Alternatively, the OPR pulse can be provided by an index signal output by the motor as it completes each rotation. At the end of pulse 3600 in the rotation signal 180, the disc 100 will have completed a full revolution and will be back at the rotational reference point (pulse 1).

Figure 9A:
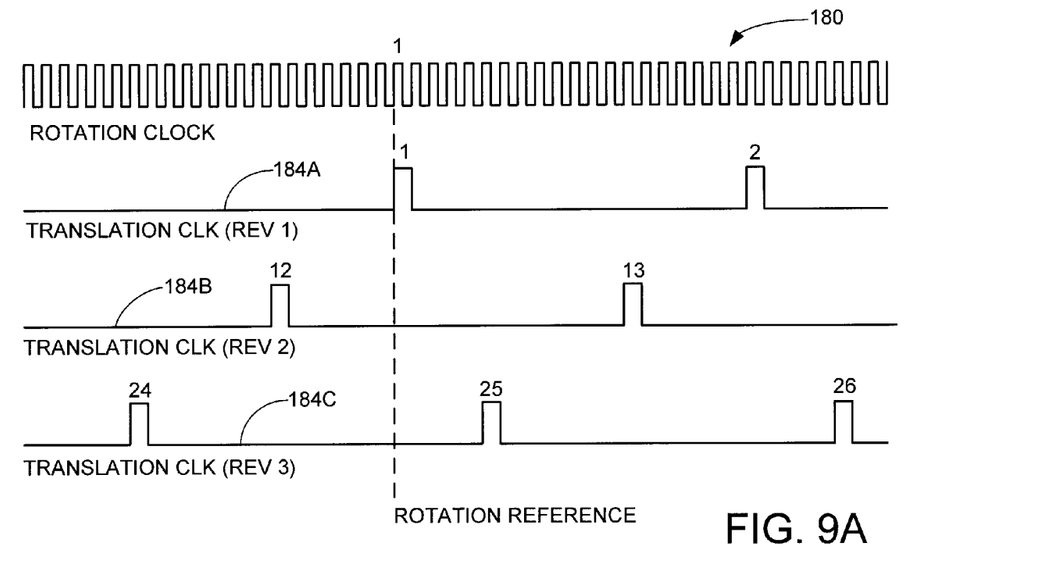
FIGS. 9A-9C show various timing diagrams of signals generated by the control circuit of FIG. 7.

FIG. 9A shows the motor pulse clock signal 180 in conjunction with portions of translation clock signals 184A-C indicative of translation clocks during respective first, second and third revolutions of the disc. Although not limiting, it is contemplated that CLV recording is used in accordance with Table 2. At a track pitch of 1.23 µm and 0.1 µm/step, there will be approximately 12.3 translation pulses per rotation. Translation signal 184A shows translation pulse 1 beginning at the rotation reference point and translation pulse 2 occurring thereafter at the associated translation clock frequency.

Translation signal 184B shows the end of the first rotation and the beginning of the second rotation, with translation pulse 12 occurring approximately ⅓ of a translation clock period prior to the rotation reference point. Translation pulse 13 occurs approximately ⅔ of a translation clock period after the rotation reference point.

Translation signal 184C shows the end of the second rotation and the beginning of the third rotation, with translation pulse 24 occurring about ⅘ of a translation clock period prior to the rotation reference point, and translation pulses 25 and 26 occurring after the reference point.

Figure 9B:
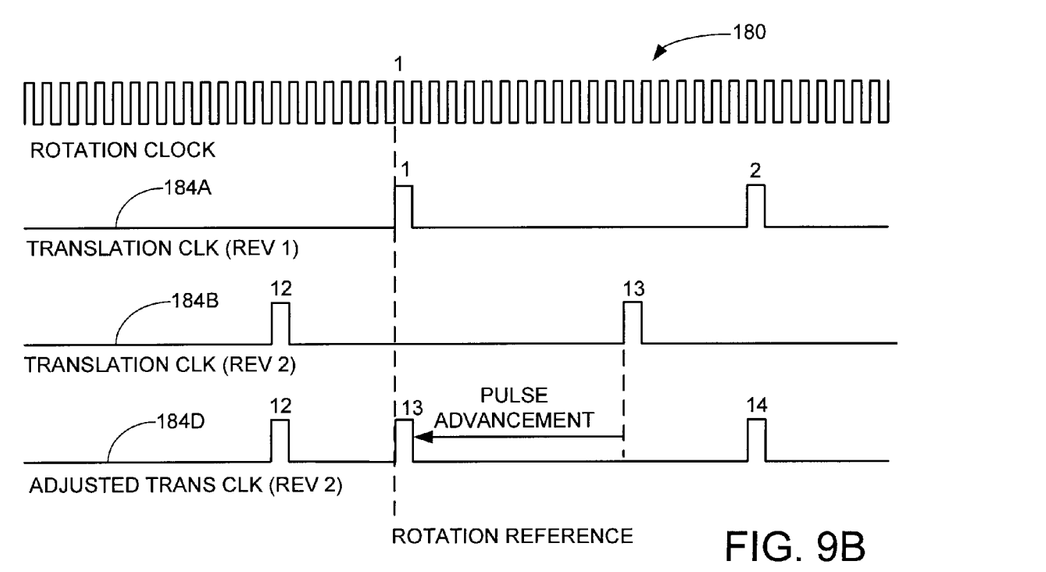

If the translation frequency is incremented across the disc during the recording operation (such as in Table 2), the translation clock can be updated at the rotation reference point on each rotation. However, this may introduce an abrupt timing irregularity in the translation clock pulse string after each update. FIG. 9B illustrates such timing irregularities. The translation clock signal for the second revolution 184B from FIG. 9A is shown in conjunction with an adjusted translation signal clock 184D for the second revolution. The adjusted translation clock 184D advances translation pulse 13 so as to be coincident with the rotational reference point. As can be seen, this time shift significantly shortens the time between translation pulses 12 and 13. If applied to each track, this may result in a once-per-rev "glitch" in the timing at the rotational reference on each rotation.

Figure 9C:
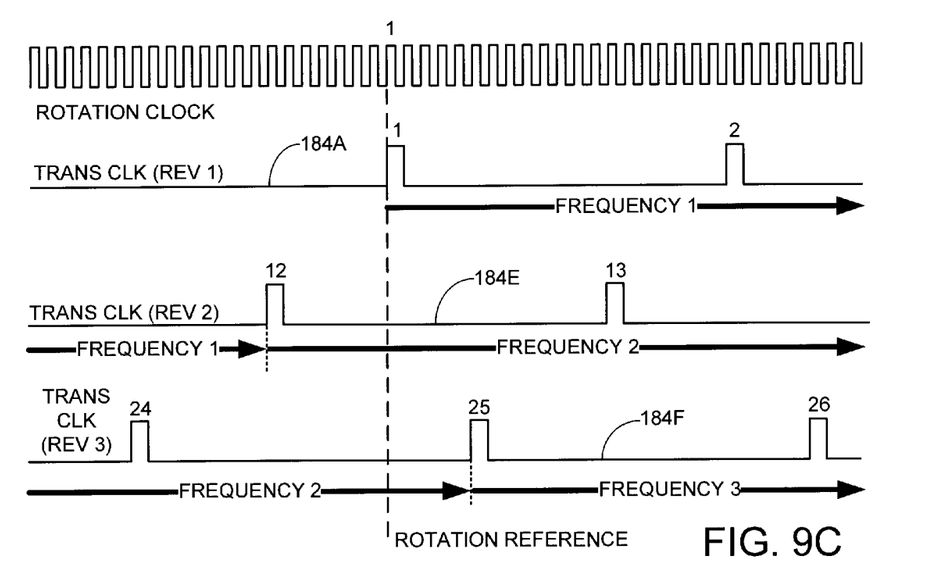

Accordingly, in some embodiments the translation clock is updated at the same point in the clock period, for example at the rising edge of a translation pulse, to avoid re-starting a new updated clock period in the middle of an existing clock period. FIG. 9C shows another timing diagram generally corresponding to the diagram of FIG. 9A with translation signals 184A over a first rotation, 184E over a second rotation, and 184F over a third rotation.

In FIG. 9C, the frequency of the translation clock is changed each time at the leading edge of the translation pulse that is closest to the rotational reference point. As shown by translation signal 184A in FIG. 9C, the first track is written beginning at the rotational reference using a first translation clock frequency ("FREQUENCY 1"). This frequency is switched to a second translation clock frequency ("FREQUENCY 2") at the leading edge of translation pulse 12 in the second revolution translation signal 184E. A third translation clock frequency ("FREQUENCY 3") is switched in at the leading edge of translation pulse 25 of the third revolution translation signal 184F. It will be noted that pulse 12 occurs prior to the rotational reference point, and pulse 25 occurs after the rotational reference point.

Figure 10:
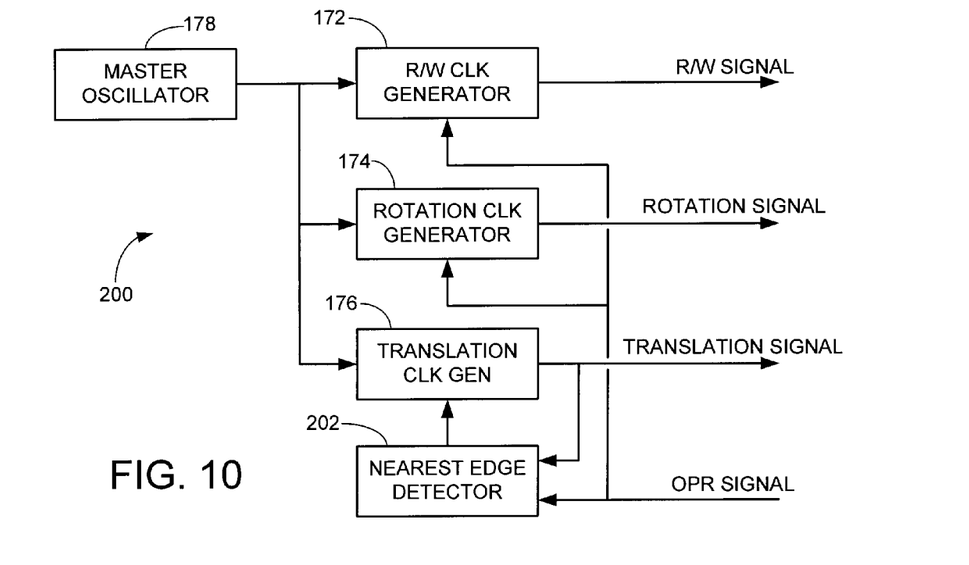
FIG. 10 provides an alternative control circuit having a nearest edge detector block to identify a control pulse occurring nearest the OPR pulse in FIG. 8 over each revolution of the medium.

FIG. 10 shows a control circuit 200 similar to the control circuit 170 discussed in FIG. 7. The control circuit 200 is configured to make the frequency adjustments shown in FIG. 9C. A nearest edge detector block 202 receives the translation signal and the OPR rotational reference pulse (e.g., pulse 182 in FIG. 8), and determines which pulse in the translation signal will occur closest in time to the OPR pulse. The detector 202 then identifies this pulse for the translation clock generator 176 so that the clock generator will change the translation clock frequency at the appropriate time.

It will be appreciated that if the detector 202 waits for the actual receipt of the respective translation and OPR pulses during a given rotation to make this determination, it will be too late to make the frequency change, particularly if the optimum time to make the change was at the transition pulse that occurred prior to receipt of the OPR pulse (e.g., pulse 12 in FIG. 9C). Accordingly, in some embodiments the detector 202 estimates the relative timing of upcoming OPR and translation pulses, and makes the determination based on this estimated timing prior to receipt of the actual pulses.

Figure 11:
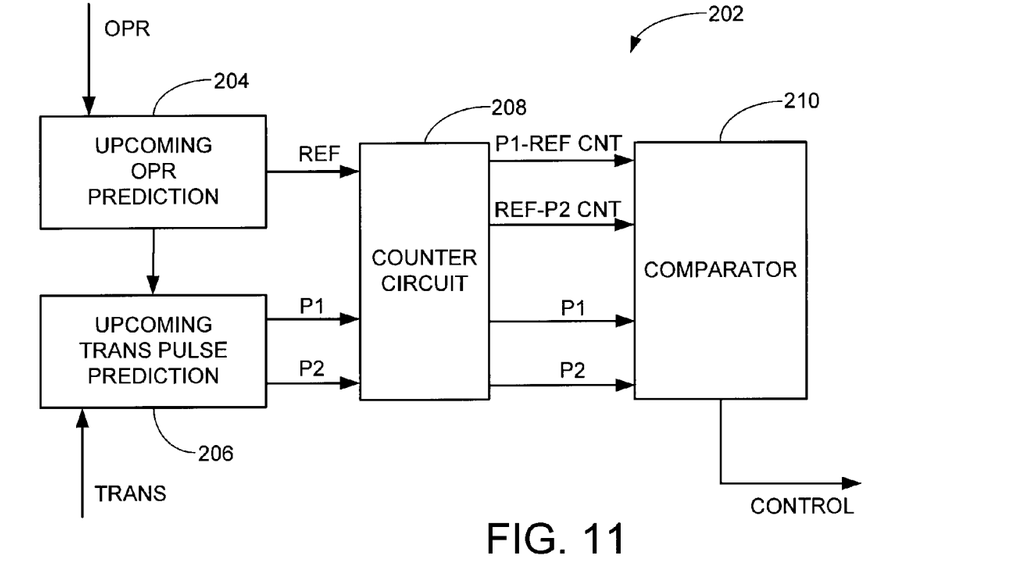
FIG. 11 shows an embodiment of the nearest edge detector block of FIG. 10.

FIG. 11 provides a functional block representation of the detector 202 of FIG. 10 in accordance with some embodiments. An upcoming OPR prediction block 204 receives the OPR pulses and generates a reference (REF) pulse indicative of the timing of an upcoming OPR pulse.

An upcoming translation pulse prediction circuit 206 uses the existing translation signal to generate pulses P1 and P2 representative of the two nearest translation pulses that will occur on each side of the REF pulse. The blocks 202, 204 can take a variety of forms, including clock multipliers and counters that simulate the respective occurrences of pulses in the existing translation and OPR streams. For example, the respective frequencies may be multiplied by some factor (e.g., 10×) and then counted to identify the two pulses that will immediately fall on each side of the upcoming OPR pulse.

Figure 12:
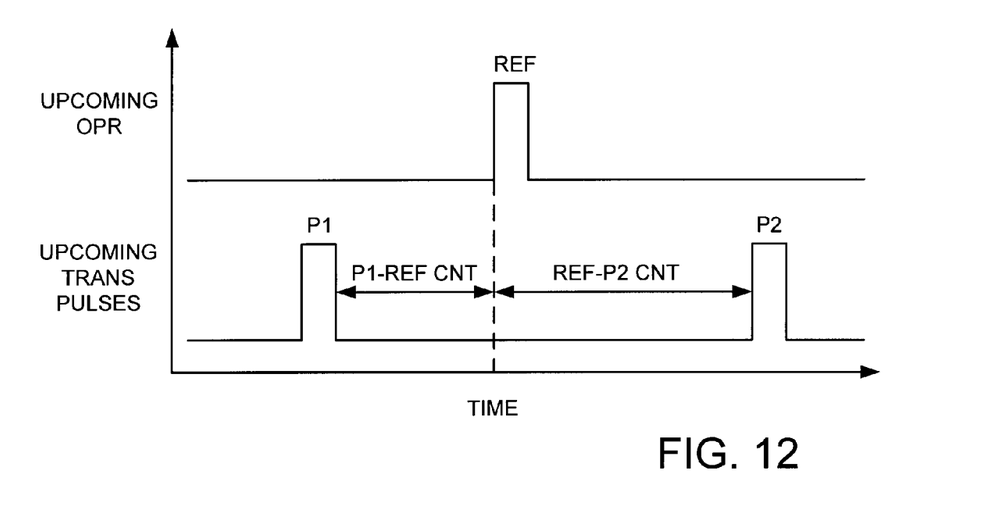
FIG. 12 is a timing diagram to illustrate operation of the detector block of FIG. 11.

A counter circuit 208 receives the REF, P1 and P2 pulses and generates two respective output counts, a first count P1-REF CNT and a second count REF-P2 CNT. As graphically depicted in FIG. 12, these respective counts are relative measures of whether the P1 or the P2 pulse will occur closer in time to the REF pulse. While the exemplary pulses in FIG. 12 show P1 to be closer to REF than P2, it is generally expected that P2 may be closer to REF than P1 about half the time. The respective intervals may also be found to be nominally equal on certain rotations, in which case the system may select a default value (e.g., select P1), or may select one of the P1, P2 pulses based on which pulse was selected at the last OPR pulse (e.g., P2 if P2 was selected last time so that substantially a full revolution is provided at the same frequency).

A comparator 210 compares the respective counts and outputs a control signal to the translation clock generator 176 to identify the upcoming translation pulse at which the next translation frequency change should be enacted. In this way, the system will be ready to increment the translation frequency upon receipt of the selected pulse.

Figure 13:
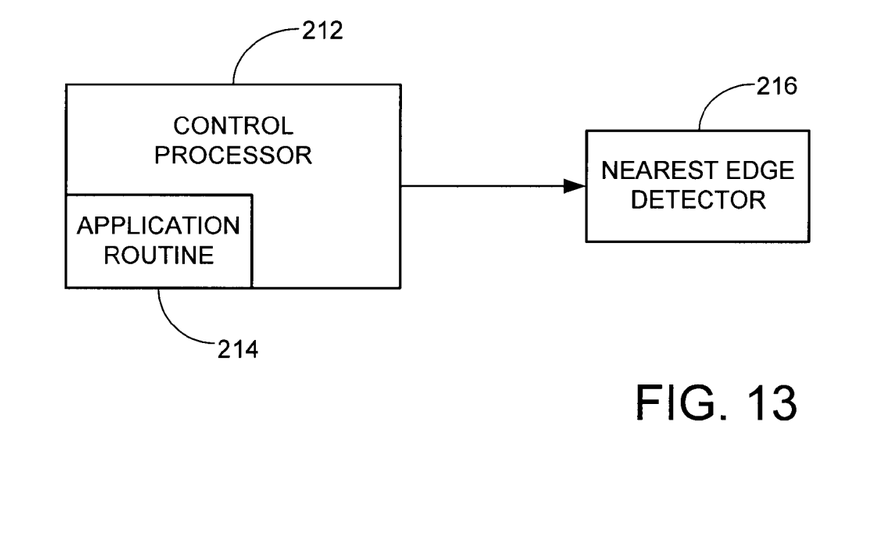
FIG. 13 shows another embodiment for the nearest edge detector block of FIG. 10.

In an alternative embodiment, as shown by FIG. 13 a control processor 212, such as a programmable computer, executes a specially configured application routine 214 stored in a computer readable memory to identify and map every pulse that will be generated over every rotation of the medium 100 prior to the write operation. In this way, the closest pulse will be known up front for each occurrence of the rotational reference point, and these pulses can be identified and stored in advance by the nearest edge detector 202.

During the operation, the nearest edge detector 202 tracks the occurrence of the OPR signals and outputs a frequency change signal to the translation clock generator 176 at the appropriate times to effect the desired changes in frequency.

Figure 14:
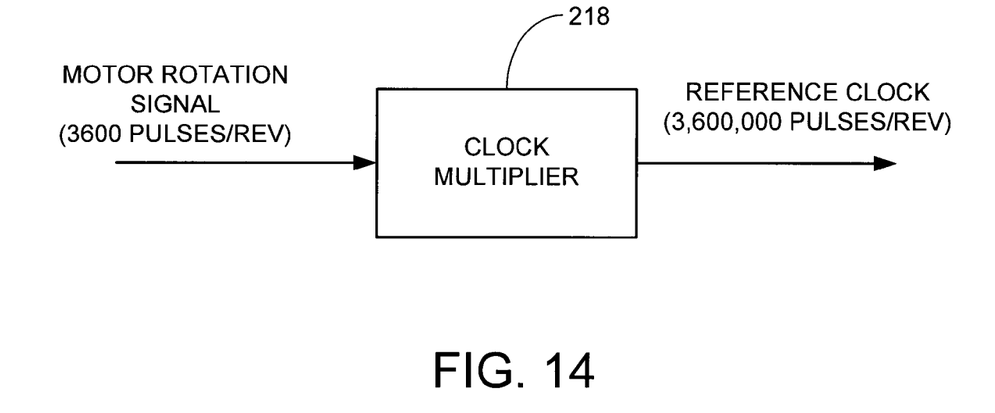
FIG. 14 illustrates use of a clock multiplier to provide a reference clock signal at an enhanced clock frequency.

While the timing of the various exemplary control pulses in FIGS. 9A-9C are shown to be clocked by the motor rotation signal so that the motor rotation clock serves as a reference clock (at 3600 pulses/revolution), in alternative embodiments a higher frequency reference clock is utilized. FIG. 14 shows a clock multiplier block 218 used to increase the frequency of a base clock signal to generate a higher frequency reference clock signal. For example, the motor rotation clock, which provides 3600 pulses per revolution, is multiplied by a factor of 1000 to provide an output reference clock that nominally provides 3,600,000 pulses/revolution. This significantly enhances the placement of the various leading edges of the control pulses to within less than 1% of an associated motor control pulse. Other base clock signals, and other multiplication factors (e.g. 50×, 2500×, etc.) can be readily used.

Figure 15:
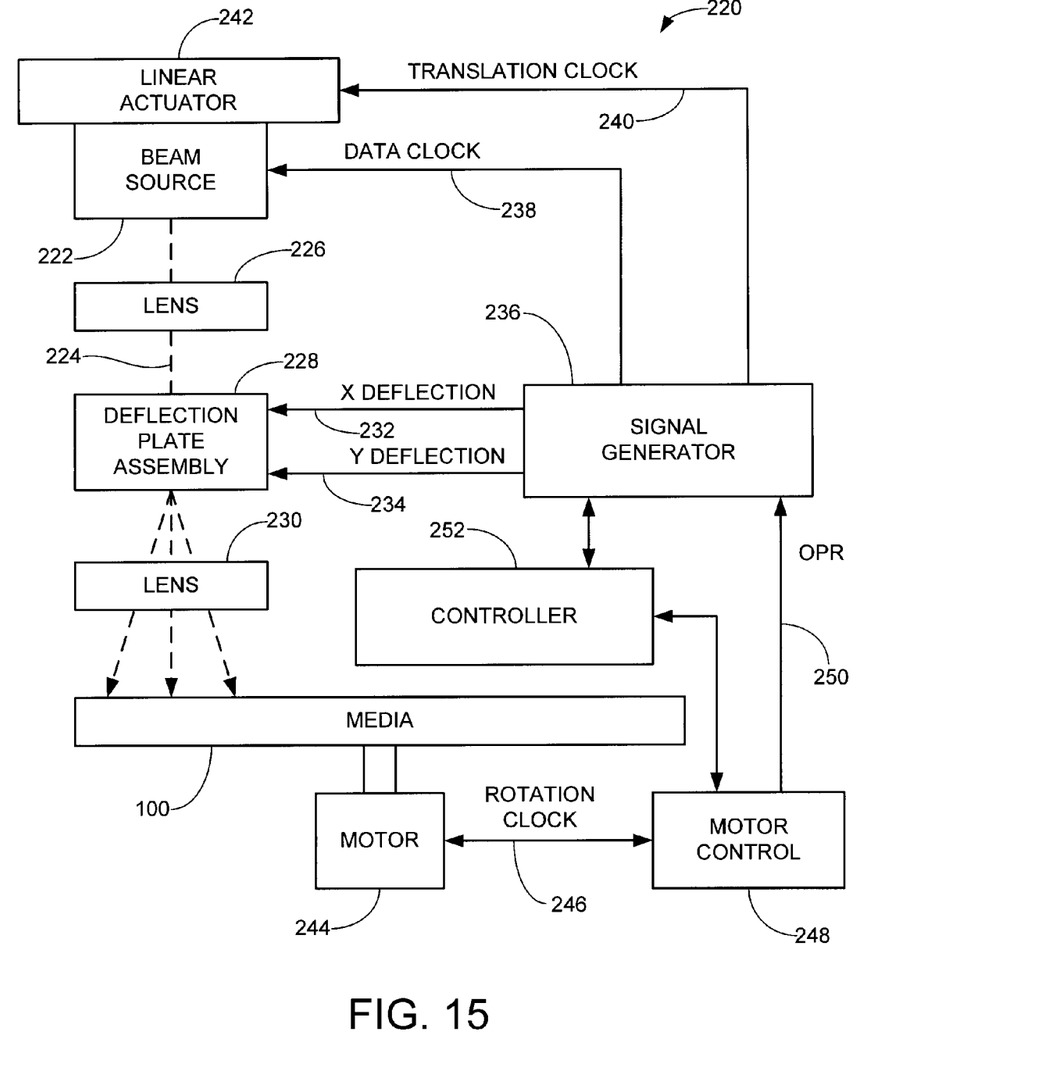
FIG. 15 is a block diagram for another write system characterized as an electron beam recorder (EBR).

FIG. 15 shows a write system 220 that can be employed in accordance with the various embodiments presented herein. The write system 220 is characterized as an electron beam recorder (EBR). As will be recognized by those skilled in the art, an EBR operates to generate a write beam comprising a stream of electrons. The write beam impinges the associated medium to write a pattern thereto. The interaction of the beam with the medium may be magnetic, chemical, dye reactive, etc. Other types of write beams are contemplated, so the EBR 220 in FIG. 15 is merely illustrative and not limiting.

A beam source 222 generates the write beam (denoted by broken line 224). The write beam 224 is passed through an upper lens assembly 226, adjacent a deflection plate assembly 228, and through a lower lens assembly 230 to impinge upon the medium 100. The deflection plate assembly 228 can impart controlled deflection of the beam 224 along the respective X and Y directions, as required.

The deflection plate assembly 228 can be arranged as respective pairs of parallel plates disposed on opposing sides of the beam path. The application of controlled voltage signals, as indicated by the X deflection and Y deflection signals on paths 232 and 234, impart a controlled displacement of the axial path of the write beam 224. Although not shown, a closed loop detection mechanism can be employed to ensure the desired amount of beam deflection is obtained in response to a given desired input. The X and Y deflection signals are generated by a signal generator block 236.

In various embodiments, the signal generator block 236 provides the aforedescribed data clock signals on path 238 to the beam source 222 to modulate (turn on/off) the write beam 224. The signal generator 236 provides the aforedescribed translation clock signals on path 240 to a linear actuator 242 to advance the write beam source (transducer) 222 across the medium along a linear translation path geometry.

A motor 244 rotates the medium 100 responsive to the aforedescribed motor rotation clock signals on path 246 from a motor control block 248. As desired, the OPR signals can be supplied by the motor control block 248 via path 250 based on the motor reference clock (or other reference clock as shown in FIG. 14). A programmable controller 252 provides top level control of the EBR 220.

It will be appreciated that the EBR 220 can be operated in accordance with the various embodiments discussed above without employing beam X-Y deflection. However, in further embodiments X-Y deflection is additionally applied to further enhance the writing operation and emulation of the target translation path geometry.

Several methods of clock generation can be utilized for the various R/W, rotation and translation clock generators, including DDS (Direct Digital Synthesis), clock dividers, and whole number or rational fractional dividers from a second clock source. For example, the rotation or R/W clocks can be used to derive the translation clock. Closed loop phase locked loop (PLL) and/or voltage controlled oscillator (VCO) circuits can be employed. Input values can be stored in memory and converted using a digital to analog converter (DAC) to implement each updated frequency value at the selected clock period boundaries. While leading edges have been selected, such are not necessarily required, as the frequency changes can alternatively be made on other clock period features such as trailing edges.

The above described methodology for adjusting the translation clock relative to a fixed rotation point can also be applied to adjusting other clock signals as well, such as the R/W clock. The same technique can also be applied to correct for linear velocity (LV) variations versus radius when recording with a pivot translation system. In this application, the R/W clock generator can be updated once per rotation to compensate for the slightly shortening or lengthening circumference of each track due to the pivot translation. As before, the R/W clock frequency can be updated at a predetermined point in the R/W clock period which is closed to the rotation reference point.

While the once-per-rev (OPR) rotational reference points used in the foregoing discussion extended in a straight radial line (such as the line 106 in FIG. 1), it will be apparent that other rotational references can be used. In alternative embodiments, the actual curved path of the pivot R/W transducer can be used as the rotational reference, so each track begins at a slightly different radius from the next and all tracks begin (with respect to the rotary translation path) at the same angular position of the disc. Also, more than one rotation reference point can be utilized per rotation. For example, it may be desirable to make several frequency changes per rotation in order to create smaller frequency steps. Any number of arbitrary rotation reference points may therefore be utilized per rotation for adjustment purposes.

Finally, while the various embodiments discussed above contemplated writing one track width per rotation, it will be readily understood that multiple rotations can be utilized for each track width, with the resulting written patterns being stitched together to form an entire track width of data.

Figure 16:
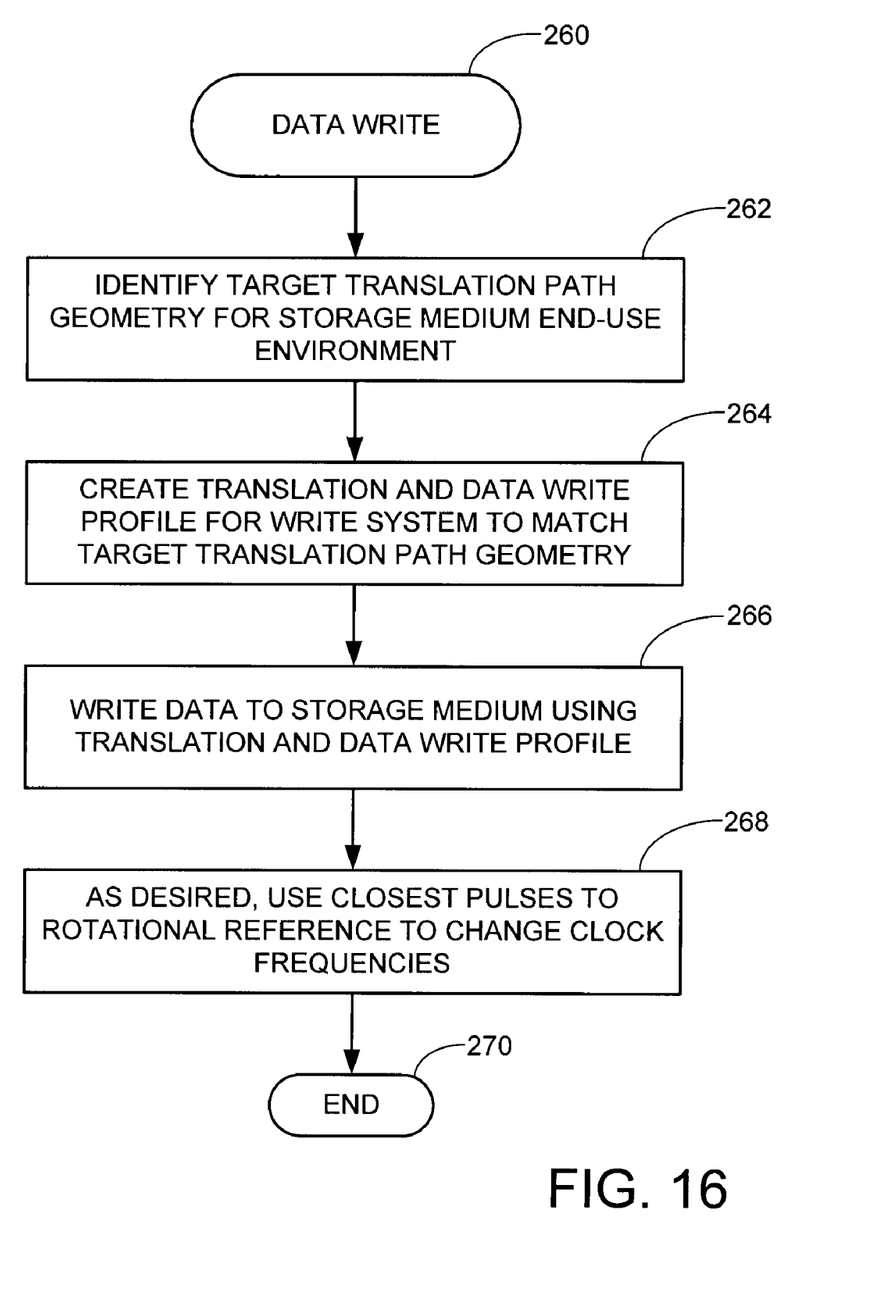
FIG. 16 is a flow chart for a DATA WRITE routine illustrative of steps carried out in accordance with various embodiments of the present invention.

FIG. 16 provides a DATA WRITE routine 260 to summarize the foregoing discussion. It will be appreciated that the routine 260 can be carried out using a write system such as 110 in FIG. 2 or 220 in FIG. 15 to write data to a storage medium such 100 in FIG. 1. The data can take any number of forms, such as servo data, pre-recorded (mastered) content data, sector header data to identify respective locations for the subsequent writing of user data, etc. The medium can be an optical disc, a magnetic data storage disc, a magneto-optical disc, etc.

As shown by step 262, the routine begins by characterizing a target translation path geometry for a storage medium in its end-use environment. For example, the end-use system may use a linear actuator as shown in FIG. 3A or a pivot actuator as shown in FIG. 3B. The translation path that a transducer will take in this end-use environment is therefore identified during this step. This step can be carried out by a computer based processor such as the control circuit of FIG. 2 or the processor 212 in FIG. 13, or other computer based system configured to calculate the target translation path geometry. This step can additionally, or alternatively, be carried out via empirical measurements of one or more exemplary end-use systems.

A translation and data write compensation profile is next generated at step 264. The compensation profile takes into account differences between the target translation path geometry and the geometry of the writing system used during the routine 260 to pre-write data to the disc. For example, the write system may employ a pivot actuator and the target environment will employ a linear actuator. In such case, the necessary number of increments per track will be identified to control the pivot actuator to write data with a constant TP, as discussed above in FIG. 4A. Alternatively, both systems may utilize pivot translation paths with different arc geometries, as set forth in FIG. 4B, etc.

The appropriate R/W clock, motor control clock and translation clock frequencies for each rotation will be calculated during this step. CAV and CLV mode considerations will also be made during this analysis. It will be appreciated that the medium may be written during the routine 200 using a different rotational mode than that which will be used in the end-use environment (e.g., CAV versus CLV, or vice versa). Zone based recording (ZBR) where bands of tracks are written at the same effective recording frequency so as to have the same numbers of sectors per track may also be accommodated during this step. As noted above, this can be carried out using a specially configured application routine such as 214 in FIG. 13.

The data are next written to the storage medium at step 266 in accordance with the compensation profile determined during step 264. In some embodiments, this will include use of a system such as 110, 220 to advance a write transducer to a starting radius, such as near the ID, and then use of the write transducer to write successive tracks of data to the storage medium to the OD beginning at the rotational reference. Various clock frequencies such as data (R/W), translation and motor rotation clocks may be maintained constant, or may be incremented with respect to radius as required. Multiple passes per track may also be utilized.

In at least some embodiments, as shown by step 268 clock frequencies will be changed during the writing step 266 in relation to the closest clock pulses (such as translation pulses or R/W pulses) to each rotational reference. The rotational reference may be a OPR index point, or some other suitable reference. Multiple references per rotation can also be used depending on the desired resolution of the finally written data. Once all of the data have been written to the medium, the routine will be terminated as shown by step 270.

It will now be appreciated that the various embodiments discussed herein provide advantages over the prior art. By taking into account differences between a final translation geometry of an end-use system environment and the native translation geometry of a writer system, the final translation geometry can be emulated by the writer system during a data pre-write operation. As desired, empirical measurements of data written by a representative end-use system can be taken to ensure the writer system correctly mimics the write characteristics of the end-use system. Selecting the nearest pulse to the rotational reference can further reduce timing irregularities and ensure smoother data transitions on the pre-written media.

Accordingly, the various embodiments of the present invention can be characterized as being directed to a method and apparatus for compensating for differences in translation path geometries of transducers used to access a data storage medium.

In accordance with some embodiments, a compensation profile is generated (such as by step 224 in FIG. 13) in relation to an error difference between a first translation path geometry (such as path 134 in FIG. 4A) of a first transducer (e.g., FIG. 3A) and a different, second translation path geometry (such as path 144 in FIG. 4A) of a second transducer (e.g., FIG. 3B). A control circuit (such as 170, 200) directs the first transducer to write data to a rotatable data storage medium (such as 100) in relation to the compensation profile to emulate the second translation path geometry.

In some embodiments, the compensation profile identifies a track pitch (TP) error between each of the first and second translation path geometries for each of a plurality of tracks on the medium, and wherein the control circuit adjusts a translation signal frequency for each said track in relation to the associated TP error for said track during the writing of the data to emulate the second translation path geometry.

In other embodiments, the compensation profile identifies a linear velocity (LV) error between each of the first and second translation path geometries for each of a plurality of tracks on the medium, and wherein the using step comprises adjusting a data write signal frequency for each said track in relation to the associated LV error for said track during the writing of the data to emulate the second translation path geometry.

In further embodiments, a once-per-revolution (OPR) rotational reference point (such as 182) at a selected angular location on the medium passes adjacent the first transducer during each revolution of the medium during the writing of said data, wherein a frequency of a pulsed control signal is changed for each revolution beginning with a pulse in the pulsed control signal that occurs closest in time to the rotational reference point (e.g., pulses P1, P2 and REF).

For purposes of the appended claims, the term "translation path geometry" and the like will be defined consistent with the foregoing discussion as a path traveled by a transducer across a radial extent of a data storage medium as constrained by mechanical and/or electrical characteristics of an actuator assembly used to translate the transducer and irrespective of the angular position of the medium, such as but not limited to the various linear and pivot paths shown in FIGS. 4A-4B. The term "radial error" and the like will be defined consistent with the foregoing discussion as a difference in feature distance, such as track width, between respective translation path geometries as measured in a radial direction across the medium (i.e., a direction that intersects a central axis about which the medium rotates).

Although numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
   generating a compensation profile in relation to radial error between a first translation path geometry of a first transducer and a different, second translation path geometry of a second transducer, the compensation profile identifying a track pitch (TP) error between each of the first and second translation path geometries for each of a plurality of tracks on the medium; and
   using the first transducer to write data to a rotatable data storage medium in relation to the compensation profile to emulate the second translation path geometry, said data written by adjusting a frequency of a translation signal for each said track in relation to the associated TP error for said track.

2. The method of claim 1, wherein the using step comprises detecting a rotational reference point at a selected angular location on the medium which passes adjacent the first transducer during each revolution of the medium during the writing of said data, wherein the frequency of the translation signal is changed for each revolution beginning with a pulse in the signal that occurs closest in time to the rotational reference point.

3. The method of claim 2, wherein the translation signal comprises a sequence of spaced apart translation pulses applied during rotation of the medium, wherein each translation pulse radially increments the first transducer by a selected radial distance across the medium, wherein a first selected translation pulse in said sequence occurs immediately before the rotational reference point and a second selected translation pulse occurs immediately after the rotational reference point, wherein a selected one of the first or second selected translation pulses occurs closer in time to the rotational reference point than a remaining one of the first or second selected transition pulses, and wherein the translation signal is transitioned from a first frequency to a different, second frequency coincident with the selected one of the first or second selected translation.

4. The method of claim 1, wherein the first transducer is disposed in a write system used to pre-write data to the medium, and wherein the second transducer is disposed in an end-use system used to read the data pre-written by the write system, and wherein the method further comprises subsequent steps of removing the medium from the write system, and placing the medium into the end-use system for access by the second transducer, wherein the removing and placing steps occur after the using step.

5. The method of claim 1, wherein the first translation geometry defines a first radial path taken by the first transducer across the storage medium as the first transducer is radially advanced from an innermost diameter (ID) to an outermost diameter (OD) of the medium, and wherein the second translation geometry defines a different, second radial path taken by the second transducer across the storage medium as the second transducer is radially advanced from the ID to the OD of the medium.

6. The method of claim 5, wherein a selected one of the first or second radial paths is characterized as a linear path, and a remaining one of the first or second radial paths is characterized as a pivot path at a selected radius of curvature.

7. The method of claim 5, wherein the first radial path is characterized as a first pivot path at a first radius of curvature having a pivot point a first distance from a central rotation axis of the medium, and wherein the second radial path is characterized as a second pivot path at a different, second radius of curvature having a pivot point a different, second distance from the central rotational axis of the medium.

8. The method of claim 1, wherein the using step comprises generating a rotation clock signal to control a rotational rate of the medium and a data write signal to write said data to the medium.

9. The method of claim 8, wherein the data write signal comprises data pulses at one or more selected frequencies, wherein each data pulse writes a data pattern to the medium, wherein a first total number of data pulses is applied to write a first track of data on the medium, and wherein a different, second total number of data pulses is applied to write a second track of data on the medium immediately adjacent to the first track of data.

10. The method of claim 1, wherein the translation signal comprises a plurality of translation pulses, wherein each translation pulse radially increments the first transducer by a selected radial distance across the medium, wherein a first total number of translation pulses is applied to write data to a first track on the medium, and wherein a different, second total number of translation pulses is applied to write data to a second track on the medium immediately adjacent to the first track.

11. An apparatus comprising:
   a first transducer configured to radially advance across a rotatable storage medium along a first translation path geometry; and a control circuit configured to direct the first transducer to write data to the medium in relation to a generated compensation profile, the compensation profile identifying radial error between the first translation path geometry and a different, second translation path geometry along which a second transducer is configured to radially advance adjacent the medium, wherein the data are written by the first transducer to emulate the second translation path geometry, the control circuit comprising:
- a data signal clock generator which generates a data signal to modulate the first transducer;
- a translation clock generator which generates a translation signal used by an actuator to advance the first transducer across the storage medium; and
- a nearest pulse detector which identifies a closest pulse in at least a selected one of the translation signal or the data signal to a once-per-revolution (OPR) rotational reference point, and adjusts a frequency of the at least a selected one of the translation signal or the data signal responsive to said closest pulse.

12. The apparatus of claim 11, further comprising an actuator which controllably advances the transducer across the storage medium along the first translation path geometry responsive to application of the translation signal.

13. The apparatus of claim 12, wherein the compensation profile further identifies a track pitch (TP) error between each of the first and second translation geometries for each of the plurality of tracks on the medium, and wherein the control circuit adjusts a frequency of the translation signal for each said track during the writing of the data to emulate the second translation geometry.

14. The apparatus of claim 12, further comprising a motor which rotates the storage medium at one or more selected linear velocities during the writing of said data responsive to a motor rotation signal supplied by the control circuit.

15. The apparatus of claim 11, characterized as a write system used to pre-write data to the medium, and wherein the second transducer is disposed in an end-use system configured to subsequently read the data pre-written by the write system.

16. A method comprising:
- generating a compensation profile in relation to radial error between a first translation path geometry of a first transducer and a different, second translation path geometry of a second transducer, the compensation profile identifying a linear velocity (LV) error between each of the first and second translation path geometries for each of a plurality of tracks on the medium; and
- using the first transducer to write data to a rotatable data storage medium in relation to the compensation profile to emulate the second translation path geometry by adjusting at least a selected one of a data write signal frequency or a rotational velocity of the medium in relation to the associated LV error.

17. The method of claim 16, wherein a selected one of the first or second translation path geometries is characterized as a linear path across an entirety of the storage medium radial width, and a remaining one of the first or second translation path geometries is characterized as a pivot path at a selected radius of curvature across said entirety of the storage medium radial width.

18. The method of claim 16, in which a first selected track of said plurality of tracks has a first specified track width selected in relation to the second translation geometry, and a second selected track of said plurality has a different, second specified track width selected in relation to the second translation geometry.

19. A method comprising:
- generating a compensation profile in relation to radial error between a first translation path geometry of a first transducer and a different, second translation path geometry of a second transducer, the first translation path characterized as a selected one of a linear path or a curvilinear path across a radial extent of the medium and the second translation path characterized as a remaining one of a linear path or a curvilinear path across a radial extent of the medium; and
- using the first transducer to write data to a rotatable data storage medium in relation to the compensation profile to emulate the second translation path geometry.

20. The method of claim 19, wherein the using step comprises generating a rotation clock signal to control a rotational rate of the medium, a translation signal to control radial advancement of the first transducer, and a data write signal to write said data to the medium.

21. The method of claim 20, wherein the translation signal comprises translation pulses at one or more selected frequencies, wherein each translation pulse radially increments the first transducer by a selected radial distance across the medium, wherein a first total number of translation pulses is applied to write data to a first track on the medium, and wherein a different, second total number of translation pulses is applied to write data to a second track on the medium immediately adjacent to the first track.

22. The method of claim 20, wherein the data write signal comprises data pulses at one or more selected frequencies, wherein each data pulse writes a data pattern to the medium, wherein a first total number of data pulses is applied to write a first track of data on the medium, and wherein a different, second total number of data pulses is applied to write a second track of data on the medium immediately adjacent to the first track of data.

23. The method of claim 19, wherein the compensation profile identifies a track pitch (TP) error between each of the first and second translation path geometries for each of a plurality of tracks on the medium, and wherein the using step comprises adjusting a translation signal frequency for each said track in relation to the associated TP error for said track during the writing of the data to emulate the second translation path geometry.

24. The method of claim 19, wherein the compensation profile further identifies a linear velocity (LV) error between each of the first and second translation path geometries for each of a plurality of tracks on the medium, and wherein the using step comprises adjusting a data write signal frequency for each said track in relation to the associated LV error for said track during the writing of the data to emulate the second translation path geometry.

* * * * *